United States Patent [19]
Hall

[11] 3,751,263
[45] Aug. 7, 1973

[54] FOAM REDUCTION DURING PREPARATION OF BEER

[75] Inventor: Ronald David Hall, Burton-on-Trent, England

[73] Assignee: Allied Breweries (UK) Limited, Straffordshire, England

[22] Filed: Feb. 1, 1971

[21] Appl. No.: 111,753

[30] Foreign Application Priority Data
Feb. 2, 1970 Great Britain..................... 4,934/70

[52] U.S. Cl............................. 99/31, 99/36, 99/39, 99/48
[51] Int. Cl............................................. C12c 11/04
[58] Field of Search................... 99/31, 48; 252/358, 252/321; 62/70

[56] References Cited
UNITED STATES PATENTS
3,525,625  8/1970  Groulx et al............................ 99/31
3,436,225  4/1969  Raible..................................... 99/48
3,634,288  4/1969  Youngs................................. 252/358
3,660,305  5/1972  Michalski........................ 252/358 X

OTHER PUBLICATIONS

Hernandez, M.R., The Use of Antifoam in Wine Fermentation, Chemical Abstracts, Vol. 62, 1965 (p. 8352g) QD1A51.

*Primary Examiner*—David M. Naff
*Attorney*—Bacon & Thomas

[57] ABSTRACT

Foaming is reduced during the preparation of beer by adding to wort or beer a silicone antifoam material, followed by removing the antifoam material by contacting the beer with an adsorbent whereby foaming capability is restored to the beer.

13 Claims, No Drawings

FOAM REDUCTION DURING PREPARATION OF BEER

This invention relates to a method of brewing beer whereby excessive foaming is avoided.

English ales and beers are traditionally fermented by strains of S. cerevisiae in what is known the top yeast process, that is by using a yeast which does not remain continually submerged but which tends to flocculate and rise with the fermentation gas to float on the liquid surface.

The volume of gas developed in the fermentation creates a substantial foam at the top of the vat and there is ultimately an accumulation of yeast and foam which may occupy a volume which is a significant fraction of the total vat volume, for example about 40 percent. Furthermore, foam volume is subject to variation over the fermentation period so that, in practice, fermentation vats in the top-yeast process are normally only run 55–65 percent full to allow sufficient space for the foam to develop. The foam contains a significant quantity of the beer, on which in the United Kingdom duty will have already been paid, and cannot therefore be discarded on an economical basis. Furthermore, the foam selectively adsorbs a significant proportion of the bittering constituents of the beer and thus excessive foaming removes a substantial proportion of the bitterness of the wort, with the result that more hops have to be utilised to obtain the desird degree of bitterness thereby increasing the cost of the final product.

The situation is aggravated by the recent use of high aspect-ratio fermentation vessels, where the total volume of fermentation gas bubbles up through a relatively small cross-sectional area and the increased turbulence creates even greater foaming.

Although the top yeast fermentation process has been used for so long, it suffers from the disadvantage that the yeast in the head of foam on the vat is removed from the nutrient source and in time may be subject to autolysis. If fermentation is carried out for a substantial time, therefore, a proportion of the yeast deteriorates.

Conventional lager beers, on the other hand, are prepared using fermentation conditions in which yeast (S. Carlsbergensis) remains submerged and eventually sediments to form a slurry at the bottom of the fermentation vessel. Traditionally, the beer is decanted from a point immediately above the settled yeast slurry. The 'cap' of yeasty foam which forms over the beer during fermentation contains a substantial proportion of the bittering components, which become oxidised by exposure to the atmosphere to produce "coarse" bittering flavours. Unless care is taken in running off the beer, this 'cap' is broken and the coarse bittering elements become mixed with the beer causing impairment of the delicate flavour. The use of fermentation vessels with a varying cross-sectional area, for example horizontal cylindrical tanks, aggravates this problem. In recent years lager has been prepared using lager wort fermented by S. cerevisiae in order to accelerate fermentation. This does, however, increase the foam problem in that a yeast-foam mass forms on the wort surface as in ale production.

It is an object of the present invention to provide a method whereby foaming can be reduced during brewery processes such as boiling, aeration and fermentation of the wort.

It is, however, a basic commercial requirement of beer, that there shall be a visible head of foam on a glass of beer when drawn or poured so that it is necessary to retain in the beer a foaming capability, that is the ability to foam readily and retain a stable foam. Consequently there is a conflict between the need to reduce foaming during brewing and the need to supply a foaming beer or ale for sale to the public.

The problem of foaming in the brewing industry is not limited to the fermentation stage and indeed undesirable foam is often generated in the preparation of the wort, for example in wort boiling, and also in the subsequent handling of the beer prior to the final packaging into containers for distribution. An added consideration is that the foaming capability of beer or wort is reduced every time foam is produced: this is because the protein material in the beer or wort which stabilises the foam becomes denatured in the air-liquid interfaces of the foam and loses its stabilising capability. Each successive foaming in the wort or beer thus reduces its potential for further foaming and this affects the final quality of the finished beer.

It is thus very desirable to inhibit foaming during beer production provided that the foaming ability can be restored before final packaging.

We have found that it is possible to reduce greatly the unwanted head of foam in the fermentation vessel or elsewhere in the brewery without reducing unduly or at all the foaming capability of the beer as publicly sold, by incorporating in the liquid a small proportion of a silicone antifoaming agent, provided that means are provided for the substantially complete removal of said antifoaming agent before the beer is finally packaged.

By using a silicone antifoam in the top yeast process, it is possible greatly to reduce the foam accumulating on the top of the fermentation vessel and, by breaking the individual bubbles which lend buoyancy to the yeast cells, it is possible to retain a far greater proportion of the yeast in the wort.

The increase in the amount of yeast in contact with the wort, coupled with the decrease in the residence time of the yeast in the foam, leads in some instances to a desirable increase in the speed of fermentation and also a more efficient conversion of malt sugers into alcohol, while reducing off flavours due to autolysis of dead yeast. The invention is primarily of interest in batch fermentation processes, which are used to produce most of the ale and lager throughout the world, but can also be applied to continuous fermentation processes.

Similarly in the primary fermentation stage of the lager process, by using a silicone antifoam it is possible to reduce the production of the coarse bitter flavours in the 'cap' of foam and hence the incorporation of these in the beer through collapse of the foam cap.

Furthermore, in wort boiling there is frequently a tendency to build up foam which often requires provision of devices for foam breaking and prevents maximum utilisation of the boiling vessel. Foaming during wort boiling is found to be inhibited to some degree by the presence of hop materials but there is at present a trend towards post-fermentation addition of hop flavours so that the concentration of hop materials the boiling wort is reduced; foaming is thus becoming an increasing problem in wort boiling. There is an additional foam problem in transferring the wort to the fermentation vessel and in aeration of the wort to promote yeast growth.

Although silicone antifoams are now quite widely used in various branches of the food industry, it has previously never been considered feasible in the brewing industry to add antifoam to beer or wort since the beer was required to foam when drawn or poured. However, using the method now provided according to this invention, it is possible to produce beer which will give a desirable foam head on being drawn or poured, but which nevertheless can be relatively foam-free during brewing and handling with the attendant advantages that this lack of foaming brings.

According to the present invention, therefore we provide a method of brewing beer in which a silicone antifoam material is dispersed in wort or beer whereby foam production is reduced, and the antifoam material is subsequently removed from the beer by contact with an adsorbent whereby foam potential and foam stability is restored to the beer.

According to a further feature of the invention we provide a process for imparting foam potential and foam stability to beer containing a silicone antifoam, wherein said antifoam is removed from the beer by contact with an adsorbent.

To reduce or prevent foaming during fermentation, the silicone may be added to the wort as an emulsion so that it is dispersed in the wort or beer and acts throughout the system. A particularly convenient method of dispersing the antifoam in wort is to add an emulsion of the antifoam to the wort as it enters the heat exchanger after wort boiling. The transport of the wort through narrow pipes within the heat exchanger causes the antifoam to be well dispersed.

Where it is desired to reduce or prevent foaming during wort boiling the antifoam can be added to the wort at this stage, for example directly into the vessel at the start of boiling or into the wort inlet line leading to the vessel. Antifoam added in this way may then be sufficient to combat foaming during the subsequent fermentation stage; however, the gases generated in fermentation aggravate the foaming problem so that more antifoam is usually required during fermentation than during wort boiling.

It is thus possible to add a relatively small quantity of antifoam to the wort prior to or during boiling and to add further antifoam at the fermentation stage. Equally, it is possible to add at the wort boiling stage sufficient antifoam to suppress foaming in both stages and, indeed, in any further handling which may generate foam.

The silicone antifoam should desirably be of food or medical grade. Such emulsions are commercially available, for example Midland Silicones Antifoam Emulsion FG. Such emulsions usually contain a polydialkylsiloxane, especially polydimethylsiloxane (commonly known as dimethylpolysiloxane), advantageously together with an emulsifying agent, a sugar alcohol long chain ester, e.g. a sorbitan or mannitan stearate or oleate or a polyoxyethylene derivative thereof; a carboxymethylcellulose or its sodium salt; a glycerol or propylene glycol monoester such as glycerol or propylene glycol stearate or propylene glycol alginate. The silicone is advantageously used together with finely divided silica, for example fume silica (S. Ross; Chemical Engineering Progress Vol 63, 1967, p 41).

The preferred dimethylpolysiloxanes employed herein are benzene-soluble polymers in which the ratio of methyl radicals to silicon atoms is in the range from 1.9 to 2.1. The viscosity of the dimethylpolysiloxane is advantageously at least 50cS at 25°C and preferably falls within the range from 200 to 20,000 cS at 25°C. Although the upper limit of the viscosity is not critical the use of the higher polymers requires more intensive mixing and may extend the time required for a satisfactory mix with other components of the antifoam preparation to be obtained. The dimethylpolysiloxanes may or may not be end-stopped. Preferably the siloxane chains are terminated with triorganosilyl groups for example trimethylsilyl, dimethylvinylsilyl or methyldiphenylsilyl groups.

The operative silicones are thus preferably substantially linear polymers containing at least 90 mol per cent $(CH_3)_2$ SiO units and limited proportions of $CH_3SiO_{3/2}$ and/or $(CH_3)_3SiO_{1/2}$ units. Trace amounts of $SiO_{4/2}$ units may also be present but the preferred dimethylpolysiloxanes are those from which such chain branching units are absent.

The silicone is preferably used in conjunction with finely divided silica to aid dispersion, preferably a silica of high surface area to weight ratio, that is a silica having a surface arae of at least 50 square metres per gram. Such silicas are well known in the art and can be obtained, for example, by a fume process, that is by burning a volatile silicon compound or by a precipitation process. The most preferred finely-divided silicas for use herein are those having a surface area to weight ratio in excess of 100 square metres per gram. Preferably 0.1 to 20 per cent by weight and more preferably from 1 to 7.5 per cent of the finely-divided silica, based on the weight of the dimethylpolysiloxane, may be used.

We have further found that for use in brewing, an dispersion of silicone in a sugar syrup, for example a cereal starch hydrolysate or malt extract, is also useful. The sugar syrups will be resistant to microbiological attack due to the high concentration of solute. They may assist emulsification of the silicone but it is usually preferable to add an emulsifying or dispersing agent of a grade suitable for use in brewing for example of the type mentioned above. In this way it is possible to preserve a substantially sterile composition without adding synthetic preservatives. The syrup preferably has a solids content of at least 65 percent, more preferably at least 15 percent by weight. The concentration of silicone and silica in the composition is preferably 1 to 50 percent by weight.

The concentration of silicone in the wort or beer is preferably not greater than 20 ppm, conveniently up to 10 ppm; the most preferred range is 1 to 8 ppm. The concentration in the beer after fermentation will be considerably less than the concentration adding during or before fermentation due to adsorption onto the yeast.

In general, the fermentation of ale requires the most antifoam, the fermentation of lager beer requires less and the prevention of foaming during wort boiling and transfer and transit of the beer after fermention require the least.

The antifoam is normally adsorbed to a large extent on the yeast present during fermentation. In some instances, where the original foaming tendency was slight so that a low concentration of antifoam was used and where the yeast has a high adsorptive capacity for the antifoam, the antifoam may be adsorbed from the beer simply by contact with the yeast. It should be noted that the yeast may be recycled over long periods without apparent deterioration to accumulation of antifoam. In most cases, however, sufficient antifoam will remain after removal of yeast, to reduce foaming the beer and a further adsorbent will be required to restore a foaming capability to the beer.

The adsorbent used to remove the silicone antifoam will be an adsorbent capable of adsorbing the silicone in the presence of an aqueous system. A suitable adsorbent for this purpose may be selected from the following group: silica gel, an alumino-silicate, alumina, aluminium salts such as aluminium phosphate or hydrated aluminium sulphate, kieselguhr, isinglass or activated carbon.

The quantity of adsorbent required to remove the antifoam will vary with such factors as the nature of the adsorbent, the particular antifoam used, the quantity of antifoam added and the other finishing processes applied to the beer. The optimal quantity can readily be determined by preliminary experiments. In general, the adsorbent may, for example, constitute 0.015 to 0.15 percent by weight of the beer treated.

The adsorbent used should be chosen with regard to its effect on other constituents of the beer and the flavour and other requirements of the particular beer concerned. When yeast has been removed from the beer, it is a vital step in brewing economy that as much beer as possible is separated from the yeast since in the United Kingdom and many other countries excise duty will have been paid on all the fermented liquid. The beer so separated will, however, normally contain excessively high levels of bittering substances and some undesired flavours associated with the separated yeast and it is desirable to remove these by treatment with an adsorbent. Since the proportion of beer treated in this way is relatively small, it is not necessary to retain every one of the beer flavour components apart from the alcohol so that a non-selective adsorbent can be used, for example activated carbon. Such an adsorbent will also readily remove any antifoam which is released by the yeast.

In the treatment of the main body of the beer it may be desirable to remove certain protein-tannin complexes as well as the antifoam and this can be achieved by contacting the beer with an appropriate alumino-silicate adsorbent, for example bentonite, or with a silica gel. Kieselguhr may also be used advantageously although its adsorptive power is relatively low and it is usually best used in conjunction with more highly adsorptive solids such as silica gel.

The adsorbent is conveniently added to the beer prior to the conventional filtration to remove residual yeast so that a single filtration step is used. However, it is also possible to add the adsorbent after yeast removal and to remove the adsorbent by a separate filtration step.

Silica gel used to remove the antifoam may conveniently be a finely divided adsorbent grade of silica gel of a purity suitable for use in the brewing industry, for example that sold under the brand names Stabifix, Stabiquick and Lucilite. Aluminosilicate adsorbents include, particularly, those of the montmorillonite type e.g. bentonite. The adsorbent is conveniently added as a mixture with one or more extenders which may themselves have some adsorbent action, for example, as indicated above, kieselguhr.

The adsorbents used in the present process preferably have a large surface area, for example, a specific surface area of at least 100 m$^2$/gm.

We have found in tests carried out with varying silicone antifoam concentrations that the foaming can be greatly reduced during brewing while the foaming capability of the finished beer after the refining procedures is substantially unaltered. The taste of the beer brewed in the presence of silicone antifoam could not be distinguished from control beers brewed conventionally, apart from, in some instances with particular yeast strains, an increase in bitterness.

In the conventional processing of beer, the fermented wort is treated to remove, as far as possible, the suspended yeast.

In the top yeast ale-brewing process, the greater part of the yeast is removed initially by skimming to give a residual yeast concentration in the beer of about 2 - 8 million cells per ml. This concentration is normally subsequently reduced to less than 0.5 million cells/ml by the use of finings such as isinglass. In certain high quality beers, there may be a rough filtration on kieselguhr followed by a "polishing" filtration, usually on cellulose filter sheets. A substantial part of the antifoam, namely that which is adsorbed on the yeast, is removed during these fining and filtering stages, but to ensure that the foaming capability of the finished beer is retained, any significant quantity of antifoam remaining must be removed and treatment with adsorbent is required more especially to remove antifoam which is not adsorbed by yeast. In this way the foaming capability of the finished beer is maintained and, indeed, experiments have shown that the foam stability of beer which has been treated with antifoam and the antifoam subsequently removed, may even be improved due to retention of undenatured surface active nitrogluous substances such as peotides and/or proteins which would otherwise be lost in foaming.

Apart from losses of bittering principles through foaming, a certain amount is also lost in conventional brewing by adsorption of the isohumulones onto the yeast, and subsequent removal with the yeast. We have found in certain instances that an additional advantage of the present invention is that isohumulones are adsorbed onto the yeast to a lesser extent when silicone antifoams are used, possibly due to competition for adsorption sites on the yeast.

For the better understanding of the invention, we give the following Examples by way of illustration:

EXAMPLE 1 a. Summary of procedure:

Yeast (28 g pressed yeast/litre) was added to 3 200 hectolitre batches of ale wort (specific gravity 1.047) in 3 separate 305 hectolitre fermentation vessels 224 cm × 498 cm × 251 cm deep. Silicone antifoam (Midland Silicone Antifoam Emulsion FG) was then added at concentrations of 2 and 4 p.p.m. polydimethylsiloxane to two of the vessels, the third being a control.

After fermentation for over 2–3 days the beer was skimmed, racked and centrifuged and then fined with isinglass. The fined beer was subsequently chilled and treated with bentonite at a concentration of 18.7 g/hectolitre with rousing or stirring to give maximum contact for adsorption. The beer was then decanted from the settled solids and finally polished by filtration through kieselguhr.

(b) Results:

The normal working volume of the vessels used is about 55 percent (i.e. a wort depth of 138 cm allowing a foam depth of 113 cm and thereby substantially avoiding overflow of foam). At the wort depth of 164 cm used (corresponding to 200 hectolitres of wort) in the experiment, the space allowed for foam was only 87 cm, the control naturally overflowed heavily. A silicone concentration of 2 p.p.m. reduced the foam height of a maximum of just over 87 cm, i.e. the vessel just overflowed. At 4 p.p.m. however the foam height was reduced to a maximum of about 60 cm leaving a spare 27 cm of depth. This indicates that using a silicone concentration of only 4 p.p.m. the working capacity can be increased from about 55 to about 73 percent.

Furthermore, the two experimental beers had, after removal of the antifoam, higher bitterness levels than the control, thus demonstrating that the silicone reduced losses of iso-acids during fermentation. The results of the bitterness levels are shown in Table 1.

Table 1. Bitterness (EBC units)
Samples taken before centrifuge.

tubes during fermentation and indicates the composition of each fermentation. The effect of the addition of a 10 percent dispersion of polydimethylsiloxane in malt extract (an 80 percent solids malt syrup) and in Kelcoloid (propylene glycol alginate) is shown in comparison with two controls.

A trimethylsilyl end-stopped dimethylpolysiloxane having a viscosity of approximately 1000 cS at 25°C and a volatiles content of less than 0.5 per cent by weight was mixed thoroughly with 5 per cent of its weight of a fume silica having a surface area of 100 $m^2/g$. The product was a thick paste.

Malt extract (9) parts) was heated to 70°C. 10 parts of the dimethylpolysiloxane/silica paste added with stirring, the stirring being continued for 30 minutes after addition. The product was then passed, while hot, through an ultrasonic homogeniser. For incorporation into the wort, the malt extract preparation was homogenised with a portion of the wort to effect uniform dispersion and this dispersion added to the fermentattion of the wort. It should be noted that for large scale operation such homogenisation may be uneconomical and it is then preferable to incorporate dispersing or emulsifying agents into the malt extract composition.

TABLE 1

| Hrs. after pitching | Control 1 | | Control 2 | | Control average | | 4 p.p.m. anti-foam (Kelcoloid) | | 4 p.p.m. anti-foam (malt extract) | | 8 p.p.m. anti-foam (Kelcoloid) | | 8 p.p.m. anti-foam (malt extract) | | 20 p.p.m. anti-foam (Kelcoloid) | |
|---|---|---|---|---|---|---|---|---|---|---|---|---|---|---|---|---|
| | SG | Ht. | SG | Ht. | SG | Ht. | SG | Ht. | SG | Ht. | SG | Ht. | SG | Ht. | SG | Ht. |
| 8 | 35 | 2.2 | 36 | 1.8 | 35.5 | 2.0 | 36 | 0.5 | 36 | 0.5 | 36 | 0.3 | 36 | 0.4 | 35 | 0.1 |
| 24 | 26 | 6.5 | 27 | 5.0 | 26.5 | 5.7 | 27 | 1.6 | 27 | 1.5 | 27 | 0.9 | 27 | 0.8 | 28 | 0.5 |
| 27 | 25 | 7.5 | 26 | 7.3 | 25.5 | 7.4 | 26 | 2.0 | 26 | 1.7 | 26 | 1.0 | 26 | 1.0 | 27 | 0.6 |
| 30 | 24 | 11.0 | 24 | 11.0 | 24 | 11.0 | 24 | 3.4 | 24 | 2.2 | 24 | 1.5 | 24 | 1.2 | 25 | 0.6 |
| 33 | 21 | 13.6 | 22 | 14.0 | 21.5 | 13.8 | 22 | 4.4 | 22 | 2.7 | 22 | 1.9 | 22 | 1.5 | 23 | 0.7 |
| 46 | 17 | 5.5 | 18 | 7.5 | 17.5 | 6.5 | 18 | 5.4 | 18 | 6.0 | 18 | 5.0 | 18 | 5.5 | 19 | 2.0 |
| 49 | 16 | 5.4 | 17 | 5.8 | 16.5 | 5.6 | 17 | 4.5 | 17 | 6.2 | 17 | 3.8 | 17 | 6.2 | 18 | 2.5 |
| 54 | 15 | 4.5 | 16 | 4.8 | 15.5 | 4.65 | 16 | 4.0 | 16 | 6.0 | 16 | 3.0 | 16 | 6.5 | 17 | 3.0 |
| 78 | 11 | 3.2 | 11 | 3.6 | 11 | 3.4 | 11 | 2.7 | 11 | 2.9 | 11 | 1.7 | 11 | 1.7 | 11 | 2.2 |

NOTE.—SG .... °sacch. Ht. in cm.

Control 23.2
2 p.p.m. silicone 25.3
4 p.p.m. silicone 27.3

The foam stability of the finished beer was determined by measuring the foam half-life by the method of Rudin (J. Inst.Brew. 1957, 506). The control beer had a foam half life of 126 seconds while the beers fermented at a silicone concentration of 2 and 4 p.p.m. had a foam half-life of 121 seconds.

EXAMPLE 2

Fermentations were carried out aseptically in glass tubes under the following conditions:

| Vessel | 3 litre tubes, height 90 cm diameter 7 cm |
|---|---|
| Working volume | 2 litres |
| Temperature | 70°F |
| Wort | ale malt, mash temp 145°F |
| Inoculum | Yeast (approx. 7g pressed yeast per tube) |
| Sampling | By syringe from the centre sampling port. |

Table 1 below records the height of the foam in the

EXAMPLE 3

Evaluation of 3 adsorbents in silicone removal from ale. Procedure: Three commerically available adsorbents - Stabifix, Stabiquick and Lucillite, were each added at 1.7 g. per litre of beer containing dimethyl polysiloxane (1 p.p.m. and 4 p.p.m.). The beer foam stability (expressed as the foam half-life), measured by the method of Rudin (ibid), was used as an index of the silicone adsorption. The results are summarised as follows:

| Foam half life (in seconds) Sample | control | 1 p.p.m. silicone | 4 p.p.m. silicone |
|---|---|---|---|
| After addition of dimethyl polysiloxane | 119 | 107 | 78 |
| Added Stabifix | 113 | 125 | 125 |
| Added Stabiquick | 128 | 135 | 132 |
| Added Lucillite | 129 | 120 | 129 |

The limit of 95 percent confidence for these results is ± 10 seconds. It should be noted that ale produced by fermentation in the presence of antifoam will normally contain very much smaller quantities of residual antifoam due to yeast adsorption.

EXAMPLE 4

Evaluation of 2 adsorbents in silicone removal from lager. Procedure: MS Antifoam Emulsion FG (10 percent polydimethyl siloxane) was added to 750 ml samples of lager at concentrations of 20, 40 and 100 p.p.m. of emulsion. After being kept for 48 hours each sample was filtered on either kieselguhr (1.5 g/l) + Stabifix (0.5 g/l) or kieselguhr (1.5 g/l) + Stabiquick (0.5 g/l). The first 250 ml of filtrate was rejected and the remaining 500 ml were examined for foam stability. The results are summarised as follows:

| Sample (p.p.m. silicone) | Foam life (sec)* |
|---|---|
| 0 | 340 |
| 20 | 320 |
| 40 | 310 |
| 100 | 290 | b. With 0.5 g/l Stabiquick

| Sample (p.p.m. silicone) | Foam life (sec) |
|---|---|
| 0 | 340 |
| 20 | 280 |
| 40 | 320 |
| 100 | 300 |

* Foam life measured by the method Klopper (Wall.Lab. Comm., 18, 1955, p.123).

EXAMPLE 5

The procedure of Example 1 was repeated using as fermentation vessel a so-called Nathan vessel having a high aspect ratio. This vessel was a vertical cylinder of 12 ft. diameter, the cylindrical section being 22 ft high and provided below its lower end with a conical yeast settling zone having a 70° cone angle. A cover was provided at the upper end, having a gas outlet manifold. The nominal volume of the vessel was 525 barrels. In fermentation of the stated wort in the absence of antifoam, severe foaming was observed which tended to obstruct the gas outlet manifolds even when the volume of added wort was only 400 barrels. An addition of 4 p.p.m. dimethylpolysiloxane as an emulsion, with glycerolstearate as emulsifying agent, completely inhibited foam production in the initial quarter of the fermentation period and a second addition of 4 p.p.m. prevented formation of the heavy yeasty head of foam in the final stage of fermentation. In this way, it was possible to ferment wort volumes as high as 480 barrels. It was observed that in the presence of antifoam, yeast readily settled into the conical base and could be drawn off as a 50 percent slurry with beer. After removal, this slurry was passed through a yeast filter press and the beer then treated with activated carbon ( 0.0065 lbs/barrel). The resulting beer possessed normal foam potential and stability and was blended after pasteurisation with the main body of beer from the fermentation produced by filtration, addition of Stabifix (50 g/hl. with kieselguhr 150 g/hl) and re-filtration. The resulting beer possessed normal foam potential and stability.

EXAMPLE 6

In a small experimental brewery in which the wort boiling vessel had the following dimensions viz height (21 inches); diameter (12 inches); working volume (22 litres); capacity (25 litres), it was found impossible to achieve stable conditions when boiling wort (specific gravity 1.047) at atmospheric pressure because of the incidence of foaming.

The addition of a small amount of MS food-grade antifoam to the wort before boiling (2.5 p.p.m. dimethylpolysiloxane) was completely effective in the elimination of foam. The experimental beers which are prepared from the wort by fermentation using strains of S. cerevisiae and followed by finishing with isinglass and filtration in the presence of kieselguhr on cellulose sheets exhibit normal foam stability.

EXAMPLE 7

Example 2 was repeated using Midland Silicones Antifoam FG in place of the stated malt extract and alginate (8 ppm dimethylpolysiloxane). Table 2 shows the results obtained in comparison with a control fermented without antifoam.

TABLE 2

| Time: hours after pitching | Control specific gravity °Sacch | Foam Height cm | Experimental Specific gravity °Sacch | Foam Height cm |
|---|---|---|---|---|
| 18 | 29.3 | 14.6 | 28.0 | 3.6 |
| 22 |  | 16.6 |  | 3.8 |
| 26 | 22.0 | 22.6 | 20.3 | 4.5 |
| 42 | 14.0 | 9.0 (Thick yeast) | 14.0 | 3.0 |
| 46 |  | 7 |  | 2 |
| 50 | 11.0 | 6 | 11 | 1 |

EXAMPLE 8

The following antifoam formulations were prepared by simple admixture of the constituents and, where necessary, homogenisation. All the formulations contained:

| | |
|---|---|
| Dimethylpolysiloxane | 9.5 % w/w |
| Fume silica | 0.5 % w/w | together with

| | |
|---|---|
| a. Sorbitan polyoxyethylene monostearate | 50 % w/w |
| Sodium carboxymethylcellulose | 2.0 % w/w |
| Water | 83.0 % w/w |
| b. Sorbitan polyoxyethylene monostearate | 3.0 % w/w |
| Sorbitan monostearate | 2.0 % w/w |
| Sodium carboxymethylcellulose | 2.0 % w/w |
| Water | 83.0 % w/w |
| c. Glycerol monostearate | 2.0 % w/w |
| Propylene glycol alginate 2.0 % w/w | |
| Water | 86.0 % w/w |
| d. Malt extract (80% solids) | 85.0 % w/w |
| Sorbitan polyoxyethylene monostearate | 3.0 % w/w |
| Sorbitan monostearate | 2.0 % w/w |

I claim:

1. In a method for brewing beer, the improvement which comprises inhibiting foaming during the brewery processes by dispersing in the wort or beer an initial concentration of a silicone antifoam material of about 1 to about 20 ppm to reduce foam production, followed by subsequently removing said material by contacting the beer or wort with silica gel, an alumino-silicate, alumina, an aluminium salt, kieselguhr, isinglass or activated carbon, whereby a foaming capability is restored.

2. A method as claimed in claim 1 in which the adsorbent is silica gel or bentonite.

3. A process as claimed in claim 1 in which the adsorbent has a specific surface area of at least 100 m²/gm.

4. A process as claimed in claim 1 in which the adsorbent comprises silica or bentonite in admixture with kieselguhr.

5. A process as claimed in claim 1 in which the beer is contacted with the adsorbent after removal of yeast.

6. A process as claimed in claim 1 in which fermented beer is filtered or centrifuged to remove yeast and fined before treatment with adsorbent.

7. A process as claimed in claim 1 in which the silicone antifoam is a dimethylpolysiloxane antifoam.

8. A process as claimed in claim 7 in which the antifoam is used in admixture with finely divided silica.

9. A process as claimed in claim 1 in which the initial concentration of silicone in the wort or beer is not greater than 10 ppm.

10. A process as claimed in claim 1 in which the initial concentration of antifoam in the wort or beer is 1-8 ppm.

11. A process as claimed in claim 1 in which the silicone is added to the wort or beer in conjunction with a dispersing or emulsifying agent.

12. A process as claimed in claim 1 in which the silicone is added to wort prior to or during boiling.

13. A process as claimed in claim 1 in which the silicone is added to the wort immediately prior to or during fermentation.

* * * * *